Patented June 29, 1937

2,085,640

UNITED STATES PATENT OFFICE 2,085,640

METHOD OF MAKING AN ASBESTOS-CEMENT AGGLOMERATE

Louis Czajko, Antwerp, Belgium

No Drawing. Application June 2, 1936, Serial No. 83,169. In Germany June 19, 1935

5 Claims. (Cl. 18—48.8)

This invention relates to an improved asbestos cement agglomerate or artificial stone and a method of manufacture thereof.

The production of asbestos cement artificial stone (agglomerate) is well known. A mixture of suitable proportions of cement and previously defibred asbestos is immersed in a considerable excess of water and the paste thereby obtained is then treated in a paste-board machine, the greatest proportion of the water being again removed. In this way there are obtained the artificial slate boards or tables, curved or flat plates, tubes or the like, products which are characterized essentially by a capability of absorbing 15 to 30% of their weight of water according as to whether they are compressed or not at the end of the manufacturing process.

It has also been proposed to prepare moulded asbestos cement objects which, in certain cases, imitate marble or wood articles. In this method an asbestos paste previously obtained by means of a large excess of water is broken up and then rammed or pressed into moulds where it remains until after the setting of the cement. This process produces the best results from the decorative point of view. However, the products produced are scarcely capable of withstanding considerable usage.

The object of this invention is a new artificial stone made from asbestos cement and its method of manufacture. This new artificial stone differs to a very great extent from the known asbestos cement products, in particular by the following characteristics.

Its capacity for absorbing water amounts only to from 5 to 9%. It has a considerably improved compactness and homogeneity. Its texture is so fine, regular and compact that its polished upper surface has an iridescent appearance so that its identification with an asbestos cement product is impossible, even for persons with expert knowledge of the art, unless they have resource to analysis.

Its hardness or durability is particularly great and it is thus, as well as owing to its appearance and also its characteristics, particularly suitable as a construction material for all household and sanitary objects, which must be particularly resistant to usage, blows and atmospheric influences as, for example, wall and floor covering plates or flagstones, sinks, draining boards, washing tables, bath tubes, lavatories, etc.

These remarkable and distinctive qualities of the new construction material forming the subject of the present invention are due to its particular method of manufacture. Actually in this method of manufacture the mass is not, as in the case of the earlier process, immersed in an excess of water but a very weak quantity of water is incorporated therein, which quantity is determined suitably and accurately in dependence on the nature and proportions of the materials forming the mixture, on the degree of opening of the asbestos and the fineness of the cement. This percentage of water varies also according to whether the mixture is produced by ramming or compression.

If, for example, for a mixture which was chosen for a fixed quantity of a certain kind of asbestos and a definite cement, the product is to be treated by ramming then the most favourable quantity of water to be added must be predetermined for each case. This water content is entirely different from that which is used in the manufacture of concrete and to a still greater extent from that used in the methods of production which are used for the manufacture of asbestos cement mixtures. It was discovered by the inventor that very small variations, of only some percents, of this larger or smaller water content undoubtedly affects the characteristics and distinctive qualities of the product. Too large an amount causes considerable lowering of the resistance in various directions and produces a product unsuitable for its purpose; too small an amount likewise produces a faulty product which is liable to disintegration by scaling.

The production of the asbestos cement artificial stone or agglomerate in accordance with the invention is effected by ramming or compressing the materials in moulds, and in contradistinction to the known products the subject of the present invention offers this valuable and characteristic advantage that it allows the immediate removal of the products at the conclusion of the manufacture and the setting of the cement can then subsequently take place without any disadvantage.

The manufacture includes the following steps:

(1) The loosening or opening of the asbestos and its intimate mixing with the cement, sand and the colouring materials in well known apparatus, as, for example, by means of grind stones, edge runners and disintegrators.

(2) The gradual moistening with accompanying stirring of the mixture. This moistening can be effected particularly in a rotating drum with continuous aspersion from the inside during the rotation of the drum. By this moistening the mass is mixed in the form of nodules, the formation of which plays a necessary and useful role ensuring the production of products having homogeneous and valuable properties as well as marked and coloured appearance. The moistening is the part of the operation requiring the most care and is mainly dependent on the very small addition of water; by the obtaining of uniform nodules it is also possible to give a certain particular predetermined appearance to the products.

(3) The moulding of the products in suitable moulds by the known process by manual ramming, with compressed air, electricity or other means, or in a press as in the production of plates. It must be here mentioned that the vibrating and shaking processes which are advantageously used in the production of most concrete mixtures are not suitable for the present process.

(4) After the moulding has been effected the products can be immediately removed and left undisturbed. After one or two days they must either be immersed in water or be kept under water for some weeks according as to whether they are pressed or rammed articles.

(5) After the normal hardening the upper surfaces are ground and polished by means of tools or other known methods of operation.

All nodules or pellets from one and the same mixing and which thus have a uniform colour can be introduced into the moulds. In this case products having uniform colour tones are obtained.

Moreover, in accordance with the invention nodules of different colour tones can be mixed together, which nodules are derived from various separate and suitably coloured mixtures. The products then exhibit complicated markings of various colours which, in accordance with the wish of the moulder, can have fantastic contour lines or be systematically veined, marbled, granite-like, speckled or porphry-like grained.

I claim:

1. The method of making a homogeneous molded article of fine texture, comprising intimately mixing opened asbestos and cement, slowly adding water during further mixing to form pellets, ceasing the addition of water after the mix is free of powdered material and before the pellets become pasty and then pressing the pellets into intimate contact with each other in a mold to form a dense article.

2. The method of making a homogeneous molded article of fine texture, comprising intimately mixing opened asbestos and cement, slowly adding water during further mixing to form pellets, ceasing the addition of water after the mix is free of powdered material and before the pellets become pasty and then ramming the pellets into intimate contact with each other in a mold to form a dense article.

3. The method of making a homogeneous molded article of fine texture, comprising intimately mixing opened asbestos and cement, slowly adding water during further mixing to form pellets, ceasing the addition of water after the mix is free of powdered material and before the pellets become pasty and then pressing the pellets into intimate contact with each other in a mold to form a dense article, removing the article from the mold after pressing and permitting the same to stand for one or two days and then immersing in water.

4. The method of making a homogeneous molded article of fine texture, comprising intimately mixing opened asbestos, colouring material and cement, slowly adding water during further mixing to form pellets, ceasing the addition of water after the mix is free of powdered material and before the pellets become pasty and then pressing the pellets into intimate contact with each other in a mold to form a dense article.

5. The method of making a homogeneous molded article of fine texture, comprising intimately mixing opened asbestos, colouring material and cement, slowly adding water during further mixing to form pellets, ceasing the addition of water after the mix is free of powdered material and before the pellets become pasty, and at the same time mixing up another batch of material in the same manner with different colouring material, then placing pellets of different colours in a mixed manner into a mold and pressing the pellets into intimate contact with each other to form a dense article.

L. CZAJKO.